United States Patent
Makke et al.

(10) Patent No.: US 11,539,704 B2
(45) Date of Patent: Dec. 27, 2022

(54) METHOD AND APPARATUS FOR SECURE WIRELESS VEHICLE BUS COMMUNICATION

(71) Applicant: FORD GLOBAL TECHNOLOGIES, LLC, Dearborn, MI (US)

(72) Inventors: Omar Makke, Lyon Township, MI (US); Haysam M. Kadry, Dearborn, MI (US); James Martin Lawlis, Grosse Pointe Farms, MI (US); Oleg Yurievitch Gusikhin, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1090 days.

(21) Appl. No.: 14/940,985

(22) Filed: Nov. 13, 2015

(65) Prior Publication Data

US 2017/0141917 A1 May 18, 2017

(51) Int. Cl.
*H04L 9/40* (2022.01)
*H04L 67/12* (2022.01)
(Continued)

(52) U.S. Cl.
CPC .......... *H04L 63/101* (2013.01); *G06F 13/362* (2013.01); *H04L 9/12* (2013.01);
(Continued)

(58) Field of Classification Search
CPC ..... H04L 63/10; H04L 63/101; H04L 63/108; H04W 12/06; H04W 12/08; H04W 4/008; G06F 13/36; G06F 13/362
See application file for complete search history.

(56) References Cited

U.S. PATENT DOCUMENTS 6,728,603 B2 *  4/2004  Pruzan ................ H04L 12/4604
                                                    340/531
6,823,457 B1 * 11/2004  Berstis ................ H04L 12/4625
                                                    380/262
(Continued)

FOREIGN PATENT DOCUMENTS

CN   103318107 A   9/2013
CN   103661243 A   3/2014
(Continued)

OTHER PUBLICATIONS

Hui, Li; Development and Simulation of Automotive Immobilizer System Base on Can Bus, School of Electronics and Electric Engineering; Oct. 18, 2010; 70 pages.

*Primary Examiner* — Zachary A. Davis
(74) *Attorney, Agent, or Firm* — Joseph Zane; Brooks Kushman P.C.

(57) ABSTRACT

A system includes a processor configured to wirelessly broadcast a message obtained from a first originating vehicle BUS or controller, following a determination that the message was on a pre-approved list for broadcast and having encrypted the message utilizing a temporary random key generated for a message session. The system may include vehicle controllers, a gateway module, and vehicle BUSSES connecting the system controllers to the gateway module. The gateway module may include a memory storing a list of pre-approved message types and corresponding source types, and a processor configured to receive a message from one of the vehicle controllers over one of the vehicle BUSSES to determine if a message type and source type of the received message matches an element of the list.

17 Claims, 4 Drawing Sheets

(51) Int. Cl.
*G06F 13/362* (2006.01)
*H04W 4/80* (2018.01)
*H04W 12/062* (2021.01)
*H04L 9/12* (2006.01)

(52) U.S. Cl.
CPC .......... *H04L 63/0428* (2013.01); *H04L 67/12* (2013.01); *H04W 4/80* (2018.02); *H04W 12/062* (2021.01); *H04L 2209/24* (2013.01)

(56) References Cited

U.S. PATENT DOCUMENTS

| | | | |
|---|---|---|---|
| 9,035,607 B2* | 5/2015 | LaFrance | B60L 11/1838 |
| | | | 320/109 |
| 9,184,777 B2* | 11/2015 | Esselink | H04B 1/3822 |
| 9,542,781 B2* | 1/2017 | Hatton | G07C 5/0816 |
| 9,569,353 B2 | 2/2017 | Miyake et al. | |
| 2006/0022842 A1 | 2/2006 | Zoladek et al. | |
| 2008/0167758 A1 | 7/2008 | Louch et al. | |
| 2013/0254109 A1* | 9/2013 | Beiser | G06Q 20/40 |
| | | | 705/44 |
| 2015/0172306 A1 | 6/2015 | Kim et al. | |
| 2016/0055116 A1* | 2/2016 | Duer | H04W 4/008 |
| | | | 710/105 |
| 2016/0344747 A1* | 11/2016 | Link, II | H04L 63/123 |
| 2016/0352886 A1* | 12/2016 | Dickow | H04M 1/72527 |
| 2017/0033944 A1* | 2/2017 | Nadathur | G05B 15/02 |

FOREIGN PATENT DOCUMENTS

| | | |
|---|---|---|
| CN | 104867038 A | 8/2015 |
| CN | 104980391 A | 10/2015 |

\* cited by examiner

METHOD AND APPARATUS FOR SECURE WIRELESS VEHICLE BUS COMMUNICATION

TECHNICAL FIELD

The illustrative embodiments generally relate to a method and apparatus for secure wireless vehicle bus communication.

BACKGROUND

Vehicle systems have become highly integrated with computing technology. From telematics units, to control systems, to sensors to entertainment, computer hardware and software plays a significant role in control and utilization of modern vehicles. As vehicle technology develops, the messages between vehicle controllers can also change. Reason for changes include, but are not limited to: use of new messages in an algorithm, routing a message to another controller or another processor within the same controller.

Modifying a controller's software for purpose of routing a message includes development and validation efforts. This can be both difficult and time consuming, as the highly integrated and complex nature of complete vehicle computing systems can require significant caution in order to ensure that modification to address a new feature does not negatively impact existing operational characteristics.

SUMMARY

In a first illustrative embodiment, a system includes a processor configured to wirelessly broadcast a message obtained from a first originating vehicle bus or controller, following a determination that the message was on a pre-approved list for broadcast and having encrypted the message utilizing a temporary random key generated for a message session.

In a second illustrative embodiment, a computer implemented method includes receiving a message from a vehicle bus or vehicle controller. The method also includes determining if a message source type and message type correspond to an element of a list of pre-designated message source types and corresponding message types. The method further includes sending the message to a destination type associated with the element, upon determining that the message source type and message type correspond to the element.

In a third illustrative embodiment, a system includes a plurality of vehicle system controllers, a gateway module, and a plurality of vehicle busses connecting the system controllers to the gateway module. In this embodiment, the gateway module includes a memory storing a list of pre-approved message types and corresponding source types, and the gateway module includes a processor configured to receive a message from one of the vehicle controllers over one of the vehicle busses. The processor is also configured to determine if a message type and source type of the received message matches an element of the list and to deliver the message to a destination associated with the element which the message type and source type matches.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
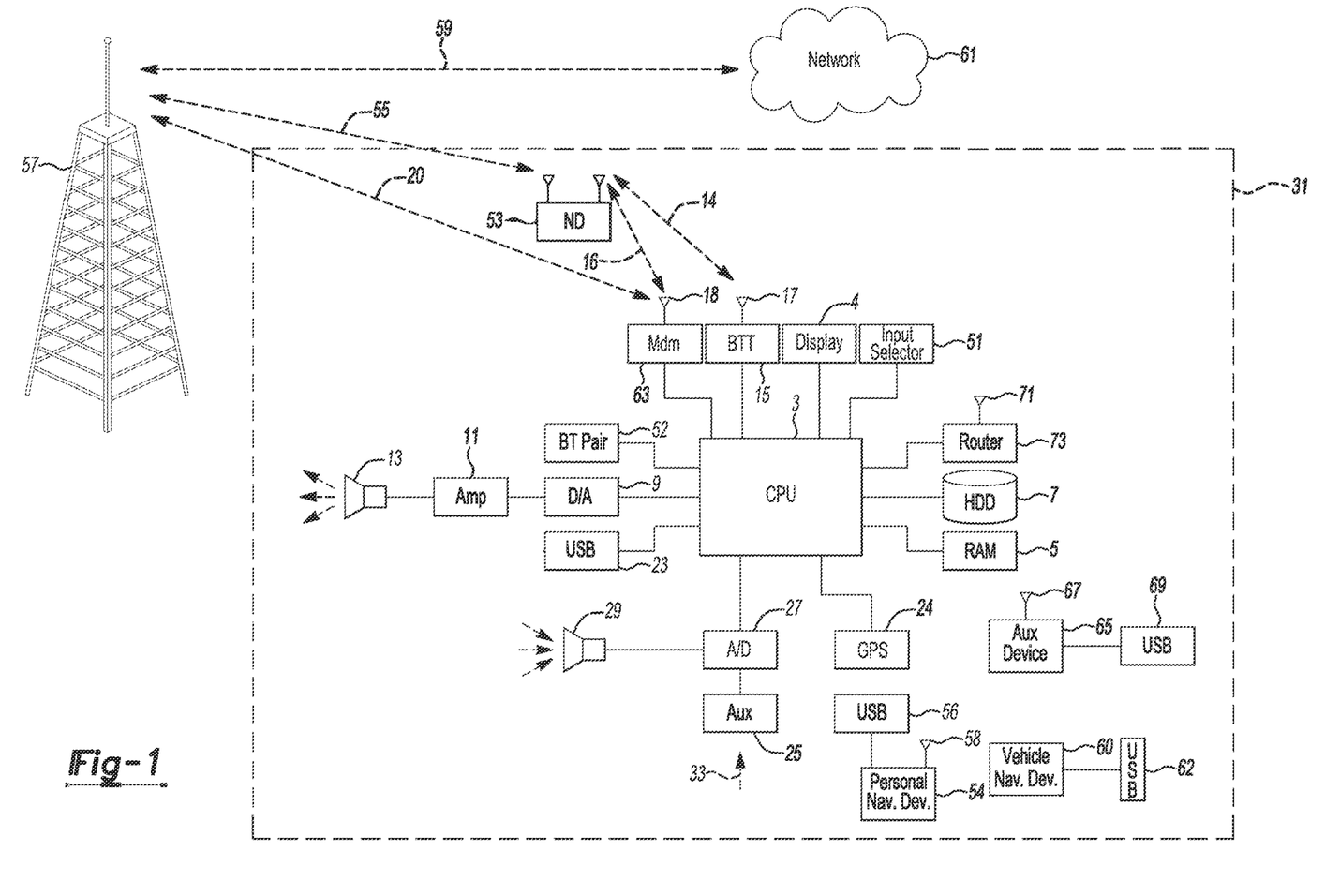
FIG. 1 shows an illustrative vehicle computing system.

FIG. 1 illustrates an example block topology for a vehicle based computing system (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH (or other short range wireless) input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a controller area network (CAN) bus) to pass data to and from the VCS (or components thereof).

Outputs from the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as personal nomadic device (PND) 54 or a USB device such as vehicle navigation device 60 along bi-directional data streams.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a Wi-Fi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an application programming interface (API) to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SOMA) for digital cellular communication. These are all ITU IMT-2000 (3G) compliant standards and offer data rates up to 2 Mbps for stationary or walking users and 385 kbps for users in a moving vehicle. 3G standards are now being replaced by IMT-Advanced (4G) which offers 100 Mbps for users in a vehicle and 1 Gbps for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 serial protocols, IEEE 1284, S/PDIF and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 802.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

As previously noted, modifying a controller's software for the purpose of routing a message includes development and validation efforts. The illustrative embodiments remove the need for such modifications, and provide systems and methods through which messages may be sent wirelessly and securely to a smart device without passing through a telematics controller.

The illustrative embodiments also allow for faster integration between smart device applications and newly added vehicle features. The illustrative embodiments also reduce the necessity to physically connect to a vehicle harness or through an (on-board diagnostics) OBD connector. Although wireless devices that can plug into an OBD connector and send (controller area network) CAN data wirelessly, these devices do not necessarily have access to all vehicle signals.

The illustrative embodiments utilize short range wireless broadcasters such as, but not limited to, BLUETOOTH low energy (BTLE) chips. Such chips can be embedded in any controller as desired. One reasonable placement of the chip is in a controller which has multiple communication busses, such as a gateway module. The gateway module can serve to route messages from one controller to another, and from one bus to another. With a BTLE chip, the gateway module can also send (and receive if desired) these messages wirelessly, and serve as a broadcasting controller.

In an illustrative example of controlled broadcast of vehicle controller and bus messages, the system may function as follows. Upon ignition, the broadcasting controller will either generate a random encryption key or receive a random encryption key from another defined controller. The broadcasting controller also stores a list or registry of approved messages, such as in the format <message, bus type>, which tells the controller which messages from which busses can be permissibly broadcast. As messages arrive on the various busses connected to the broadcasting controller, the controller checks the list to see if the message and corresponding bus are on the list. If so, the controller encrypts the message (to prevent malicious retrieval and/or utilization) and then broadcasts the message.

A smart device connected to the BTLE chip can receive the message and decrypt the message using the generated random key. In order to receive the key, the device would have to request the key and be provided the key via an initial connection or, for example, a near-field communication (NFC) connection. By obtaining the random key from the vehicle computer in a secure fashion, and by the key being generated anew with each ignition cycle, a reasonable level of security is achieved, although other similar key generation and provision schema could also be used.

When a dealer wants to access the vehicle systems or controllers to write data, the dealer can use a special pre-approved application that can change the BTLE chip to a send/receive mode that can allow messages to be passed to the gateway from a dealer device, and then those messages can be delivered to a controller or bus.

Figure 2:
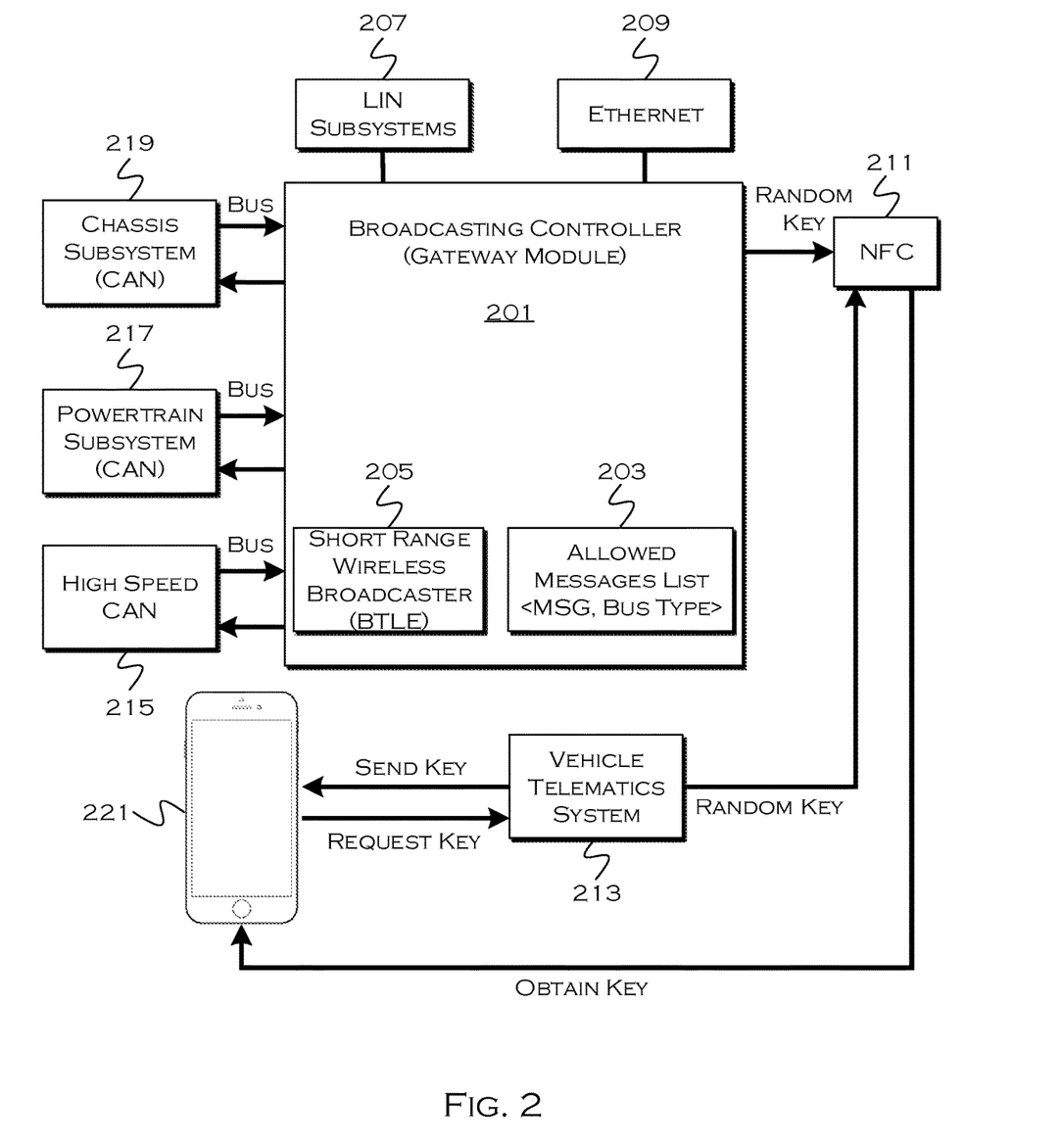
FIG. 2 shows an illustrative vehicle system including a gateway module.

FIG. 2 shows an illustrative vehicle system including a gateway module. In this illustrative example, the system includes a gateway module 201 that connects to and communicates with a variety of busses and controllers. For example, the chassis subsystem 219 may include brake controllers, airbag controllers, inertia measurement controllers, etc. The powertrain subsystem 217 can include engine, transmission and hybrid controllers. Other high-speed busses 215 such as CAN, Ethernet 209, local interconnection network (LIN) subsystems 207 etc. can also be connected, as desired.

Residing on the gateway module is a list of messages and corresponding busses 203. This can identify which messages from which busses can be broadcast and/or which messages should be transmitted to which busses.

The gateway module also may include, for example, a BTLE chip 205 for transmission of messages to and communication with local devices. This channel is used, for example, to broadcast messages received at the gateway module from the various controllers orbusses. A telematics system 213 or an NFC connection 211 can be used to transmit a random key to the mobile device 221, a key which the mobile device can also request from the telematics system. This key is then used to decrypt the bus and controller messages sent via BTLE from the gateway module to the device. In some instances, the telematics system 213 may provide the random key to the NFC transmitter 211, whereby the mobile device 221 obtains the key via NFC transmission.

Figure 3:
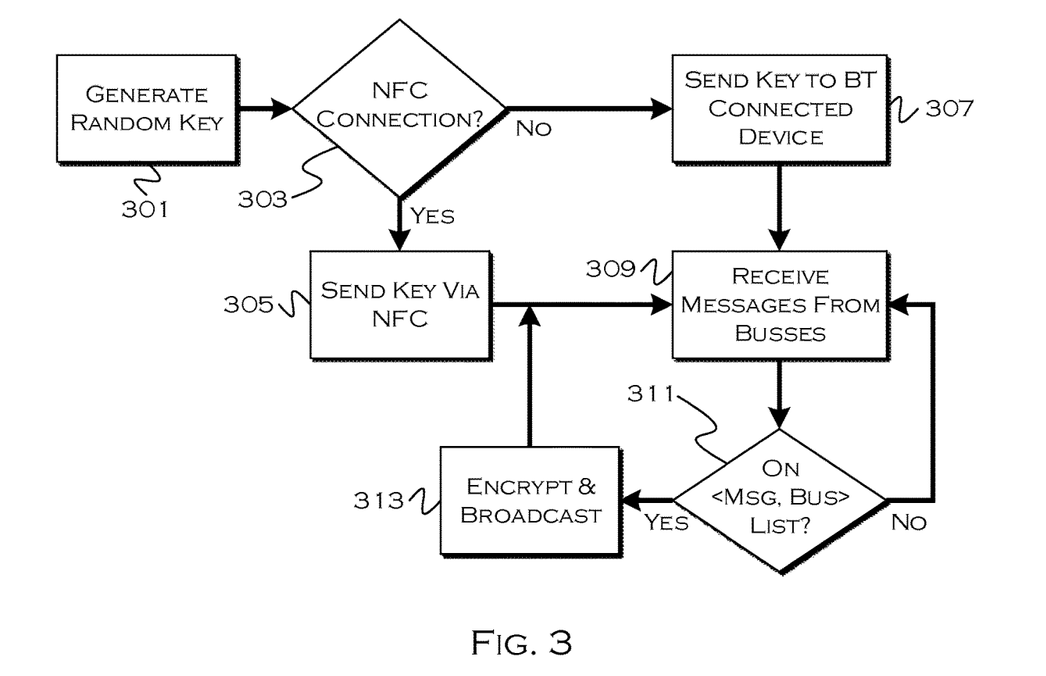
FIG. 3 shows an illustrative process for message routing.

FIG. 3 shows an illustrative process for message routing. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

First, in this illustrative embodiment, a random key is generated 301 for the session. In this example, the session is an ignition cycle. That is, when the vehicle ignition is engaged, the system generates a random key (in the gateway module or another module). Thus, each time a new ignition cycle begins, a new key is generated. This prevents use of an older key that may have been captured or obtained by a previous possessor of the vehicle, in the case of a rental car, for example. The process then determines if a connected device has NFC capability 303. In another example, the process may broadcast the key via NFC and over a wireless connection, in case there are multiple devices in the vehicle, and one is wirelessly connected and another utilizes NFC. In still another example, the key is only provided upon request, over a specified channel, which may add another level of security.

In this example, if NEC is desired and present, the process will send the key via an NFC transmission 305. Else, the process utilizes another connection (BLUETOOTH, BTLE, Wi-Fi etc.) to send the key to a connected device 307. After the device has the key, the device is capable of reading messages broadcast to the device over BTLE.

At some point in time, a message may be received at the gateway module from a controller or bus 309. The gateway checks to see if the message and corresponding bus are on an approved list for broadcast and/or on a list of routing instructions for that message 311. If so, the process will encrypt and send the message via broadcast or route it to the appropriate controller or bus as specified on the list 313. Since a random key is utilized to encrypt and decrypt the message, even if a nearby device received the BTLE transmission, unless the device had the key (generated for each ignition cycle in this example), the device would not be able to decrypt the message, preventing impermissible utilization of vehicle information by unauthorized devices.

Figure 4:
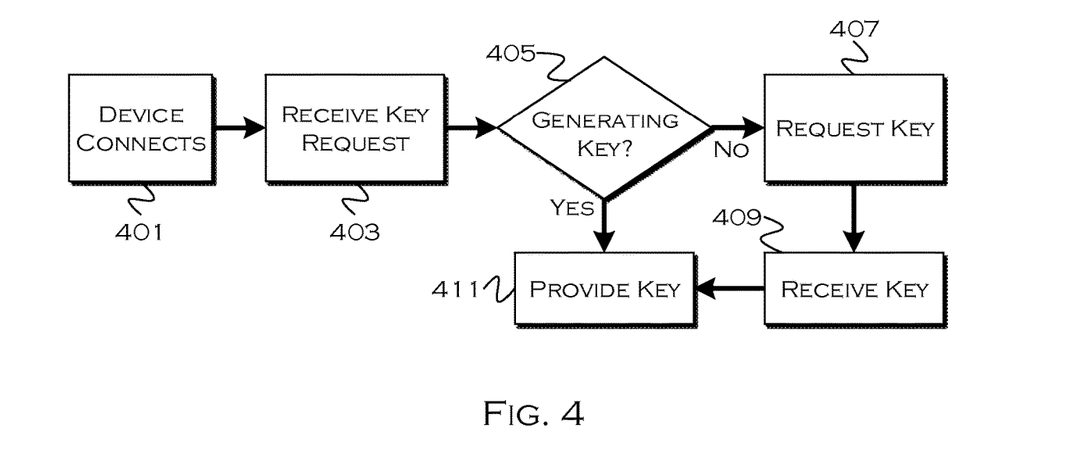
FIG. 4 shows an illustrative process for key delivery.

FIG. 4 shows an illustrative process for key delivery. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative process, a device connects to either a telematics module or to the gateway module directly, via a wireless connection (BLUETOOTH, WiFi, etc.) 401. The process then receives a request for the random key from the device 403. If the module to which the device is connected also generated the key 405, the module may provide the key to the requesting device over the wireless connection 411. Otherwise, the module will request the key from whichever module generates the key 407, and once the key is received 409, the requesting module provides 411 the key to the requesting device [[409]].

Figure 5:
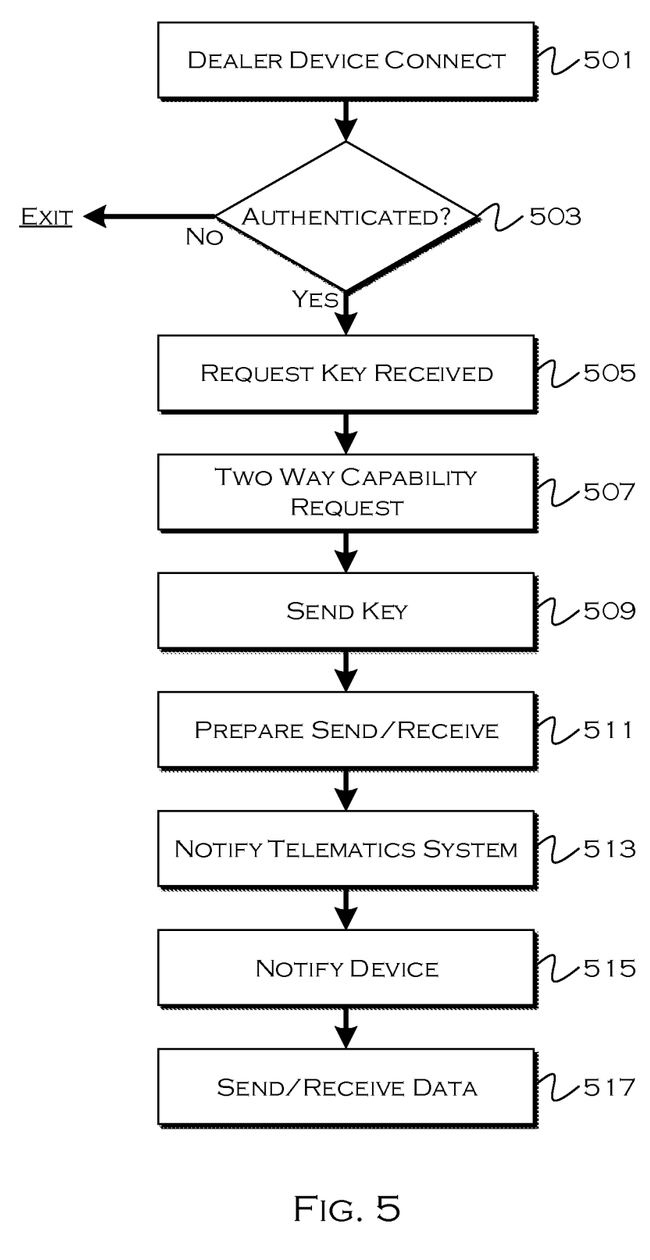
FIG. 5 shows an illustrative process for enabling two-way communication with a vehicle bus or module.

FIG. 5 shows an illustrative process for enabling two-way communication with a vehicle bus or module. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, a dealer may utilize the gateway module in order to perform maintenance or upgrades to one or more vehicle modules, controllers, systems, etc. Since this may require a write, additional precaution may be taken to ensure that an actual dealer, and not a malicious program, is connecting to the system to perform the write. To prevent this sort of access in general, the gateway module typically resides in a read-only mode, which prevents malicious writing to files. In this example, however, the dealer launches a special application (which may also include security measures, such as a password or other verification), which connects the dealer device to the telematics or gateway module 501.

Once the dealer device is connected and any necessary authentication has been performed 503, to ensure that the dealer device is authentic, the process may receive a request for a session key 505. As with the random key used for reading transmission, this key may be used to both read transmission and to encrypt data from the dealer device sent to the gateway module for distribution. This can help prevent malicious writing to the gateway or other modules while the dealer has placed the module in read/write mode (i.e., the incoming data must be encrypted with the random key and decrypted using the random key by the gateway module or it will be ignored, for example).

In addition to receiving the key request, the process also receives a request to engage read/write capability 507. In response to the request(s), the process will send the random key 509 and transition the gateway module into a read/write mode 511.

Once the transition to read/write mode has been completed, the process may notify a telematics module that read/write has been engaged 513. The process may also notify the device itself that the read/write is engaged 515. This will help ensure that write requests coming into the telematics module are properly handled and not rejected. This will also let the device know that any desired changes to vehicle modules, software and/or hardware can now be performed through two way communication of data 517. One of the updates that may be performed through this process is an update of allowed messages and the corresponding destinations or origination points for these messages. This allows simple updating of the gateway module to ensure message delivery, without having to engage in complex manipulation of particular vehicle controllers in order to change the path or nature of a message delivery.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
wirelessly broadcast a message obtained from a first originating vehicle bus or controller, following a determination that the message was on a pre-approved list for broadcast and having encrypted the message utilizing a temporary random key generated for a message session, wherein the pre-approved list includes a designation of a message type and a source type which the processor determines characteristics of the message, matching the message type and source type, prior to broadcast.

2. The system of claim 1, wherein the message session comprises a single ignition cycle.

3. The system of claim 1, wherein the source type includes a first specific vehicle bus.

4. The system of claim 1, wherein the source type includes a first specific vehicle controller.

5. The system of claim 1, wherein the pre-approved list includes a designation of destination in conjunction with the message type and source type, and wherein the broadcast includes delivery of the message to the designated destination.

6. The system of claim 5, wherein the destination is a second specific vehicle bus or controller different from the first originating vehicle bus or controller.

7. The system of claim 1, wherein the processor is configured to deliver the temporary random key to a wireless device via a wireless connection different from a wireless connection used to wirelessly broadcast the message.

8. The system of claim 7, wherein the processor is configured to receive a request to engage a read/write mode, from an application, pre-approved to request read/write, executing on the wireless device.

9. A computer implemented method comprising:
receiving a message from a vehicle bus or vehicle controller;

determining if a message source type and message type correspond to an element of a list of pre-designated message source types and corresponding message types; and upon determining that the message source type and message type correspond to the element, sending the message to a destination type associated with the element.

10. The method of claim 9, wherein the destination type includes a vehicle bus or controller different from the vehicle bus or controller from which the message was received.

11. The method of claim 9, further comprising:
generating a random key; and
encrypting the message with the random key prior to sending the message.

12. The method of claim 11, further comprising:
sending the random key to a wireless device, over a wireless connection different from the destination type.

13. The method of claim 12, wherein the wireless connection includes low energy localized wireless communication.

14. The method of claim 12, wherein the wireless connection includes near-field communication.

15. A system comprising:
a plurality of vehicle system controllers;
a gateway module; and
a plurality of vehicle busses connecting the system controllers to the gateway module;
wherein the gateway module includes a memory storing a list of pre-approved message types and corresponding source types, and wherein the gateway module includes a processor configured to receive a message from one of the vehicle controllers over one of the vehicle busses, to determine if a message type and source type of the received message matches an element of the list; and to deliver the message to a destination associated with the element which the message type and source type matches.

16. The system of claim 15, wherein the destination includes a low energy wireless communication chip and wherein the processor is configured to deliver the message through a broadcast from the chip.

17. The system of claim 15, wherein the processor is further configured to generate a random key, encrypt the message with the random key, and deliver the random key to a wireless device over a wireless connection established between the wireless device and the gateway module.

* * * * *